US011385156B2

(12) United States Patent
Misawa

(10) Patent No.: US 11,385,156 B2
(45) Date of Patent: Jul. 12, 2022

(54) PARTICLE SIZE MEASURING APPARATUS AND MEASURING METHOD

(71) Applicant: HITACHI, LTD., Tokyo (JP)

(72) Inventor: Tomonari Misawa, Tokyo (JP)

(73) Assignee: HITACHI, LTD., Tokyo (JP)

( * ) Notice: Subject to any disclaimer, the term of this patent is extended or adjusted under 35 U.S.C. 154(b) by 92 days.

(21) Appl. No.: 16/844,284

(22) Filed: Apr. 9, 2020

(65) Prior Publication Data

US 2020/0326267 A1    Oct. 15, 2020

(30) Foreign Application Priority Data

Apr. 9, 2019   (JP) .............................. JP2019-074181
Nov. 8, 2019   (JP) .............................. JP2019-203451

(51) Int. Cl.
*G01N 15/02*   (2006.01)

(52) U.S. Cl.
CPC ..... *G01N 15/0211* (2013.01); *G01N 15/0227* (2013.01); *G01N 2015/0294* (2013.01)

(58) Field of Classification Search
CPC ........... G01N 15/0211; G01N 15/0227; G01N 2015/0294; G01N 15/147; G01N 2015/0038; G01N 2015/1493; G01N 15/1475
USPC ....................................................... 356/336
See application file for complete search history.

(56) References Cited

U.S. PATENT DOCUMENTS

| 2008/0100840 A1* | 5/2008 | Oma .................. | G01N 15/1463 356/339 |
| 2018/0120214 A1* | 5/2018 | Kato .................. | G01N 15/1463 |
| 2018/0275038 A1* | 9/2018 | Cantin ............... | G01N 15/0211 |

FOREIGN PATENT DOCUMENTS

| CN | 105115864 A | 12/2015 | |
| CN | 105115866 A | * 12/2015 | ............ G01N 15/02 |
| CN | 105115866 A | 12/2015 | |
| EP | 0281077 A2 | 9/1988 | |
| EP | 3088863 A1 | 11/2016 | |
| EP | 3279636 A1 | 2/2018 | |
| JP | 2000-146817 A | 5/2000 | |
| JP | 2009-156595 A | 7/2009 | |
| KR | 10-2008-0083485 A | 9/2008 | |
| WO | 2017/054070 A1 | 4/2017 | |

OTHER PUBLICATIONS

Partial European Search Report dated Aug. 25, 2020 for European Patent Application No. 20168854.6.
Korean Office Action dated Apr. 6, 2021 for Korean Patent Application No. 10-2020-0039572.

\* cited by examiner

*Primary Examiner* — Roy M Punnoose
(74) *Attorney, Agent, or Firm* — Volpe Koenig

(57) ABSTRACT

A particle size measuring apparatus capable of measuring a smaller particle size includes: a first light source configured to emit parallel beam to a sample containing particles; a first image capturing apparatus disposed to approximately face the first light source with the sample disposed therebetween and configured to capture an image of the sample; and an image analyzing unit configured to analyze the image captured by the first image capturing apparatus. The first image capturing apparatus and the first light source are disposed so as to approximately face each other so that an image of scattered light of the parallel beam incident on particles and scattered at a prescribed angle θth or smaller is captured by the first image capturing apparatus. The image analyzing unit is configured to calculate a particle size on the basis of a scattered light image captured by the first image capturing apparatus.

8 Claims, 15 Drawing Sheets

FIG. 6
(1)
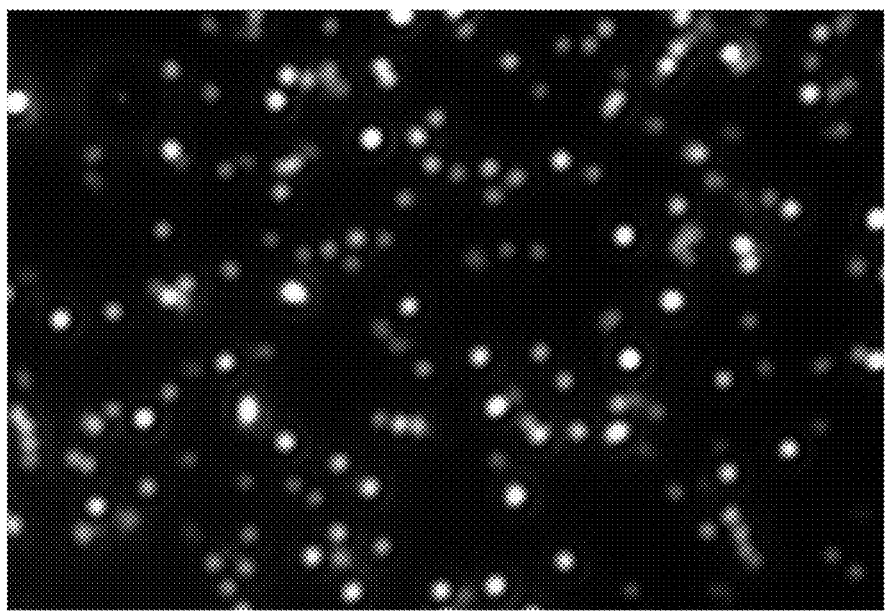
(2)
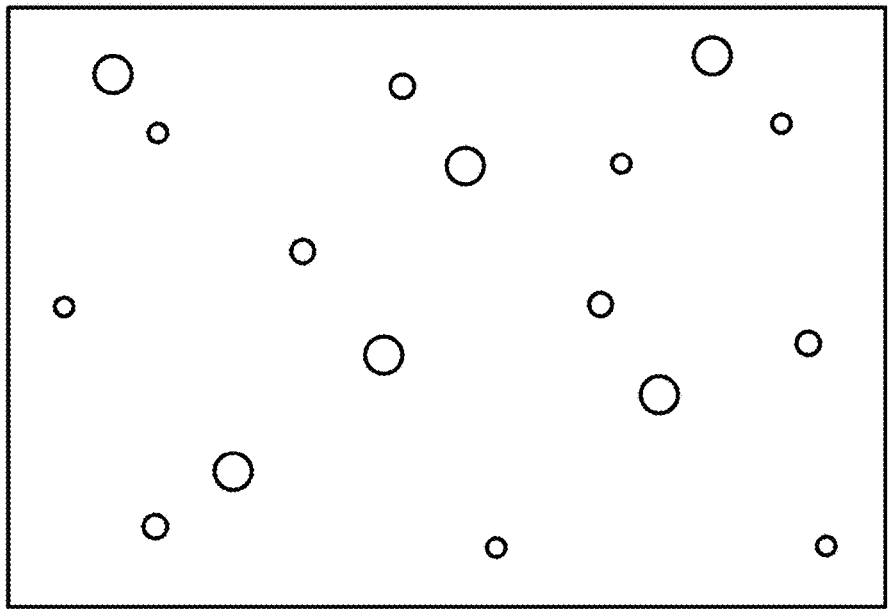

FIG. 15
(1) View seen from optical axis 11
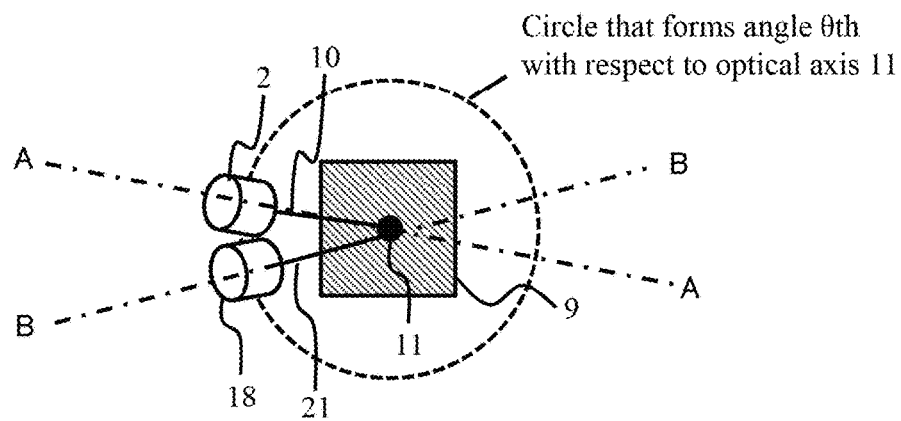
(2) View of cross-section A-A
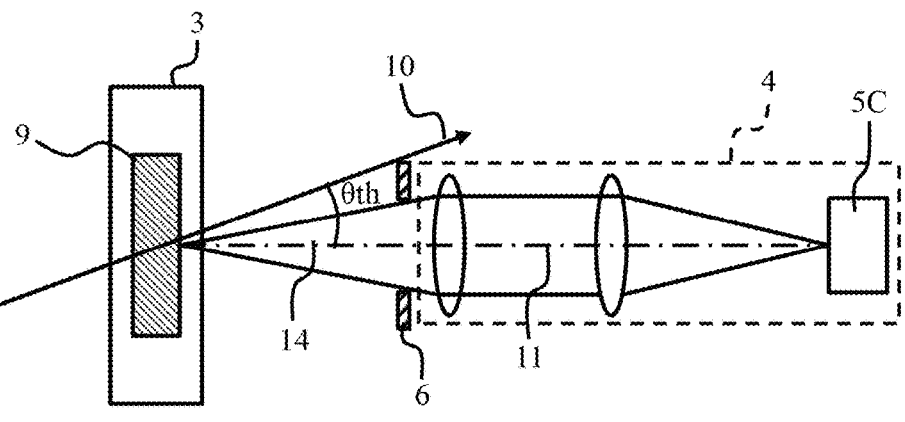
(3) View of cross-section B-B
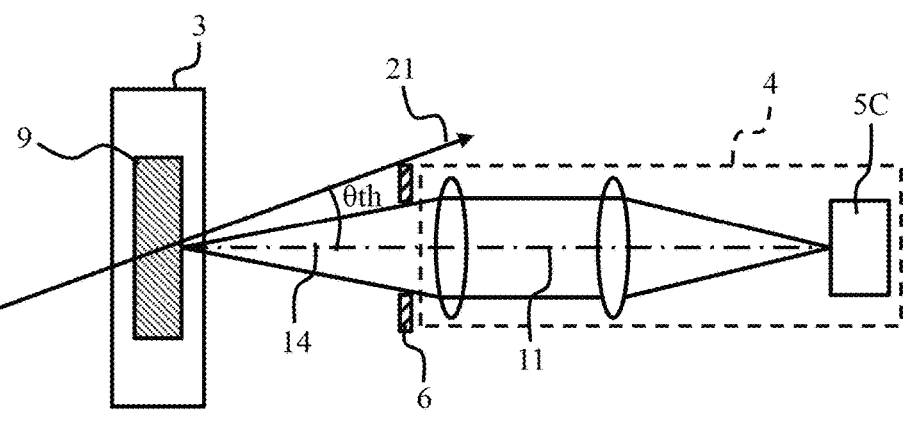

PARTICLE SIZE MEASURING APPARATUS AND MEASURING METHOD

BACKGROUND

The present invention relates to a particle size measuring apparatus and a measuring method.

Japanese Patent Application Publication No. 2009-156595 discloses a technique of measuring a particle size distribution of a sample. In Japanese Patent Application Publication No. 2009-156595, a light source that emits light having a single wavelength toward a sample and an image sensor that captures a projection image of the sample are provided, and a particle size is calculated by analyzing an image captured by the image sensor.

SUMMARY

In the technique of Japanese Patent Application Publication No. 2009-156595, individual particles are recognized from the captured image and a particle size is calculated from the shapes of the recognized particles. However, there is a limit on a particle size recognizable optically, and it is generally difficult to recognize a particle having a particle size of 1 µm or smaller.

The present invention has been made in view of the above-described problems, and an object thereof is to provide a particle size measuring apparatus and a measuring method capable of measuring a smaller particle size.

In order to solve the problems, a particle size measuring apparatus according to an aspect of the present invention is a particle size measuring apparatus that measures a particle size, including: a first light source configured to emit parallel beam toward a sample containing particles; a first image capturing apparatus disposed to approximately face the first light source with the sample disposed therebetween and configured to capture an image of the sample; and an image analyzing unit configured to analyze the image captured by the first image capturing apparatus, wherein the first image capturing apparatus and the first light source are in prescribed arrangement so as to approximately face each other so that an image of scattered light of the parallel beam incident on particles and scattered at a prescribed angle or smaller is captured by the first image capturing apparatus, and the image analyzing unit is configured to calculate a particle size on the basis of a scattered light image captured by the first image capturing apparatus.

According to the present invention, since an image of scattered light in which parallel beam incident on a particle is scattered at a prescribed angle or smaller is captured by a first image capturing apparatus, it is possible to measure a smaller size than when capturing an image of a particle.

BRIEF DESCRIPTION OF THE DRAWINGS

FIG. 6 is an explanatory diagram illustrating an example of an image of scattered light;

FIG. 15 illustrates an arrangement example of light sources according to a modification.

DETAILED DESCRIPTION OF THE EMBODIMENT

Hereinafter, embodiments of the present invention will be described with reference to the drawings. A particle size measuring apparatus according to the present embodiment can be used as a particle size distribution measuring apparatus, for example. The particle size measuring apparatus according to the present embodiment can be used in a static environment such as a laboratory and can be used in a dynamic environment such as a factory or a plant. Furthermore, the particle size measuring apparatus of the present embodiment can measure a particle size of a sample in a stopping state and can measure a particle size of a sample while continuously conveying the sample.

A particle size distribution measuring apparatus 1 as a particle size measuring apparatus according to the present embodiment allows parallel beam to be incident on particles to generate scattered light scattered at a prescribed scattering angle or smaller and calculates a particle size from an image of the scattered light. Therefore, it is possible to measure a smaller size than when measuring a shadow image of particles.

First Embodiment

Figure 1:
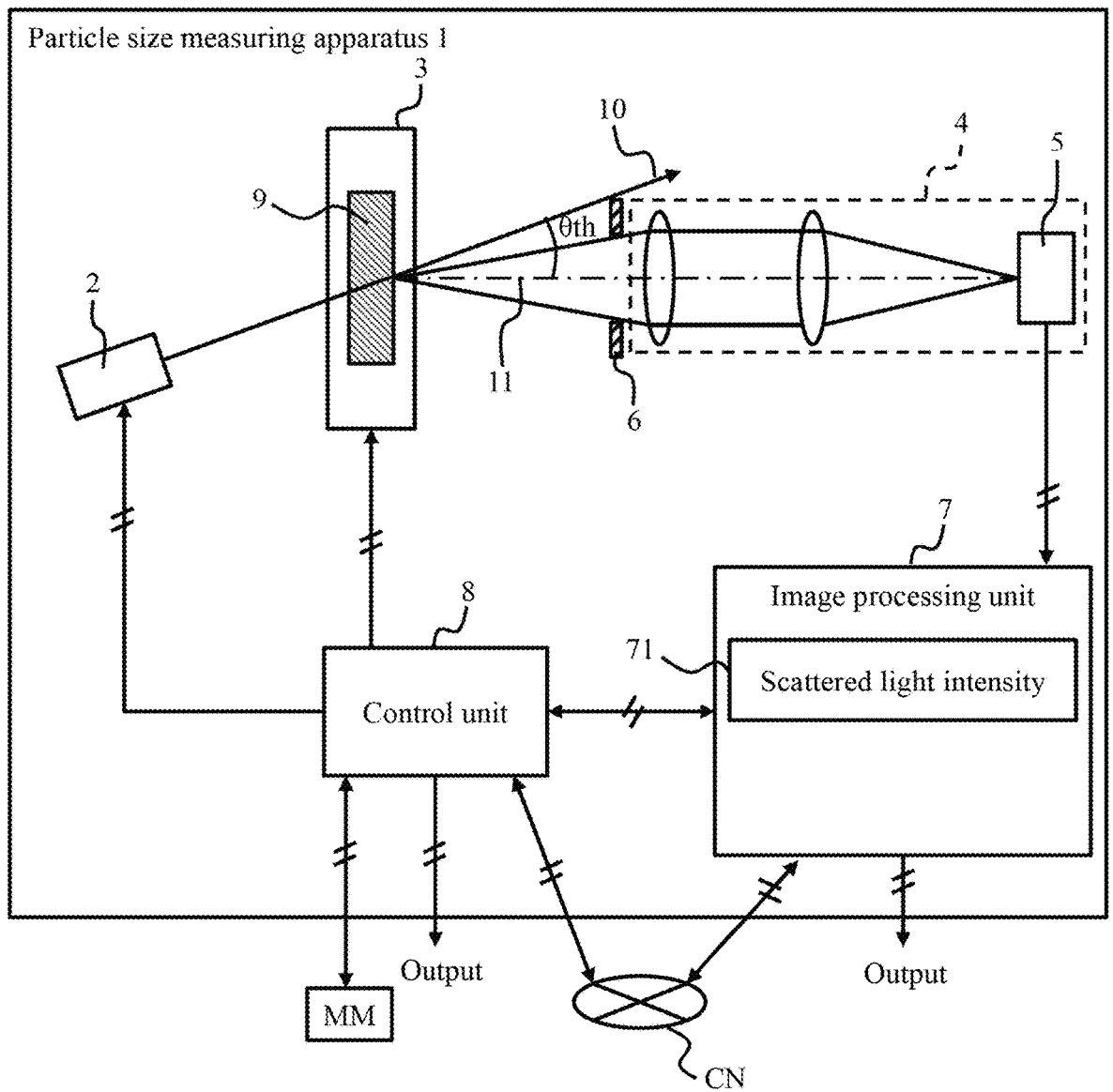
FIG. 1 is a diagram illustrating a configuration of a particle size distribution measuring apparatus.

A first embodiment will be described with reference to FIGS. 1 to 7. FIG. 1 illustrates a schematic configuration of a particle size distribution measuring apparatus 1 according to the present embodiment. The particle size distribution measuring apparatus 1 includes, for example, a light source 2, a measuring unit 3, a microscope 4, an image capturing unit 5, a light blocking plate 6, an image processing unit 7, and a control unit 8.

The light source 2 as an example of "first light source" emits parallel beam 10 toward a sample 9 provided on a measuring unit 3. A light emitting element used in the light source 2 may be an LED, a laser, or the like, for example. When a laser is used, a speckle pattern may be produced due to optical interference of a group of particles contained in the sample 9. Therefore, when a laser is used, interference may be reduced by providing a diffuser, a speckle reducer, or the like, for example.

Here, an optical axis of the parallel beam 10 is shifted from an optical axis 11 of the microscope 4 by an angle θth illustrated in the drawing. The parallel beam 10 is set such that a distribution width of parallelism with respect to the optical axis thereof is sufficiently smaller than the angle θth.

A beam size and a shape of the parallel beam 10 are designed such that components having passed straightly without being scattered by the particles 91 (see FIG. 2) in the sample 9 are not incident on the image capturing unit 5, only images of the light beams scattered by the particles 91 are captured by the microscope 4, and light beams can be emitted toward an entire field of view of the microscope 4 in the sample 9.

Figure 5:
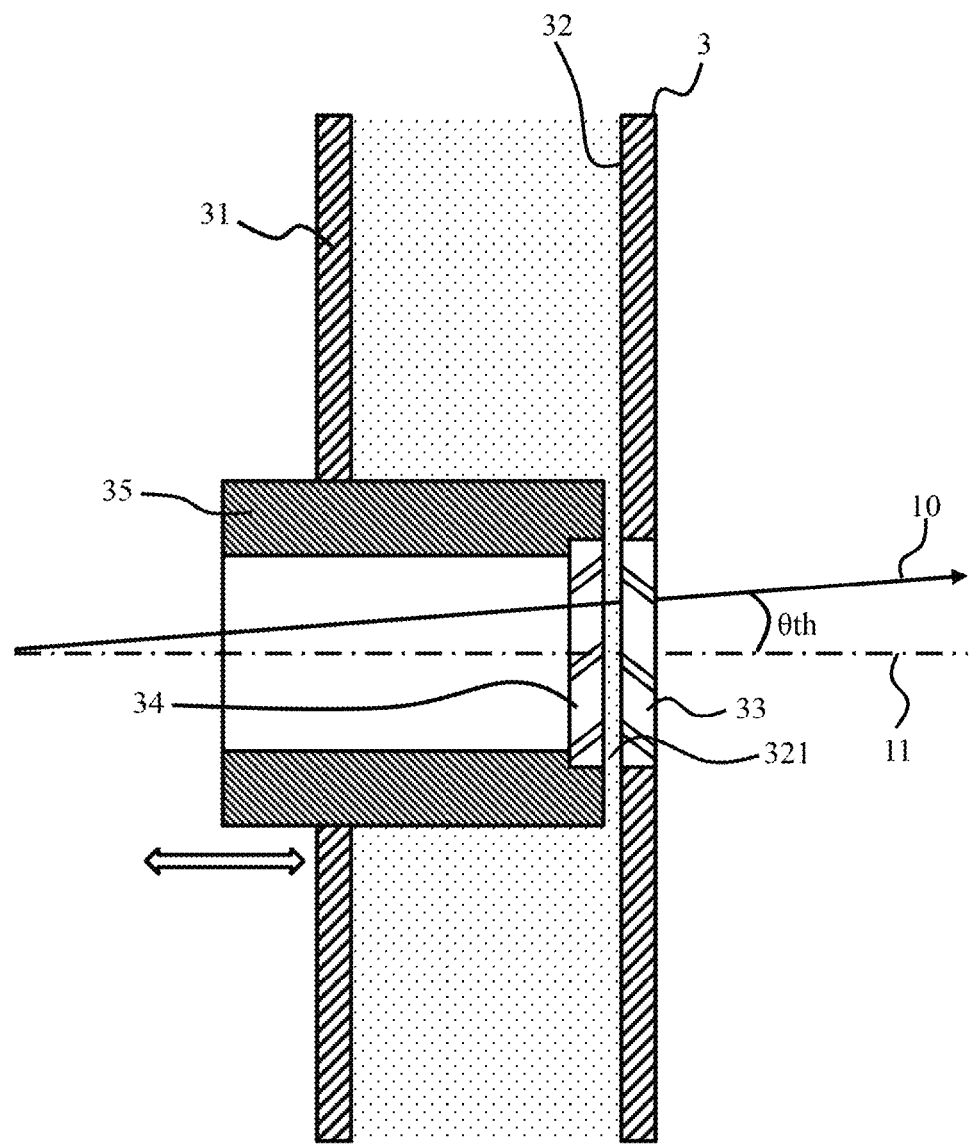
FIG. 5 is a diagram illustrating a configuration of a measuring unit.

A configuration of the measuring unit 3 will be described later with reference to FIG. 5. The microscope 4 as an example of "first image capturing apparatus" is disposed so as to approximately face the light source 2 with the measuring unit 3 disposed therebetween. The microscope 4 converts incident light (in this example, scattered light generated by particles) to an electrical signal with the aid of the image capturing unit 5 to generate image data and transmits the image data to the image processing unit 7.

Here, the light source 2 and the microscope 4 approximately facing each other with the measuring unit 3 having the sample 9 disposed therebetween means that the parallel beam 10 of the light source 2 and the optical axis 11 of the microscope 4 do not match (that is, the parallel beam 10 of the light source 2 and the optical axis 11 of the microscope 4 are not parallel but cross each other). More specifically, the light source 2 and the microscope 4 approximately facing each other with the measuring unit 3 disposed therebetween means that they are disposed so as to face each other so that the parallel beam 10 of the light source 2 and the optical axis 11 of the microscope 4 cross each other at a prescribed angle θth smaller than 90°.

A light blocking plate 6 that prevents unnecessary light (in this example, light incident directly from the light source 2) from entering the microscope 4 may be provided in an incident portion of the microscope 4. An example of the light blocking plate 6 will be described later with reference to FIG. 3.

The image processing unit 7 as an example of "image analyzing unit" calculates a particle size on the basis of a scattered light intensity. A computer program 71 stored in a memory (not illustrated) is read and executed by a microprocessor (not illustrated), whereby the function of the image processing unit 7 is realized. The image processing unit 7 calculates the sizes of particles included in a scattered light image on the basis of the scattered light image acquired from the image capturing unit 5 of the microscope 4. A calculation result of the image processing unit 7 is transmitted to the control unit 8. The image processing unit 7 may output signals for monitoring a measurement state to an external monitor (not illustrated) or the like.

The control unit 8 controls an operation of the particle size distribution measuring apparatus 1. For example, the control unit 8 controls turning on/off of the light source 2 and adjusts the measuring unit 3. Furthermore, the control unit 8 may output a warning signal and transmit information such as a particle size or a particle size distribution state to other system (not illustrated) on the basis of the measurement result of the image processing unit 7.

The control unit 8 can be configured as a computer including a microprocessor, a memory, an interface circuit, and the like, for example. In this case, the microprocessor reads and executes a prescribed computer program stored in the memory whereby the computer realizes the function of the control unit 8.

Instead of an example in which the image processing unit 7 or the control unit 8 is realized by a computer and a program, the image processing unit 7 or the control unit 8 may be realized mainly by a hardware circuit. In this case, hardware capable of changing a connection configuration and the like of circuit elements according to data for controlling the circuit configuration may be used.

When the image processing unit 7 or the control unit 8 is realized by a computer and a computer program, some or all parts of the computer program or some or all parts of the data used may be stored in a recording medium MM or may be transmitted suing a communication network CN.

Figure 2:
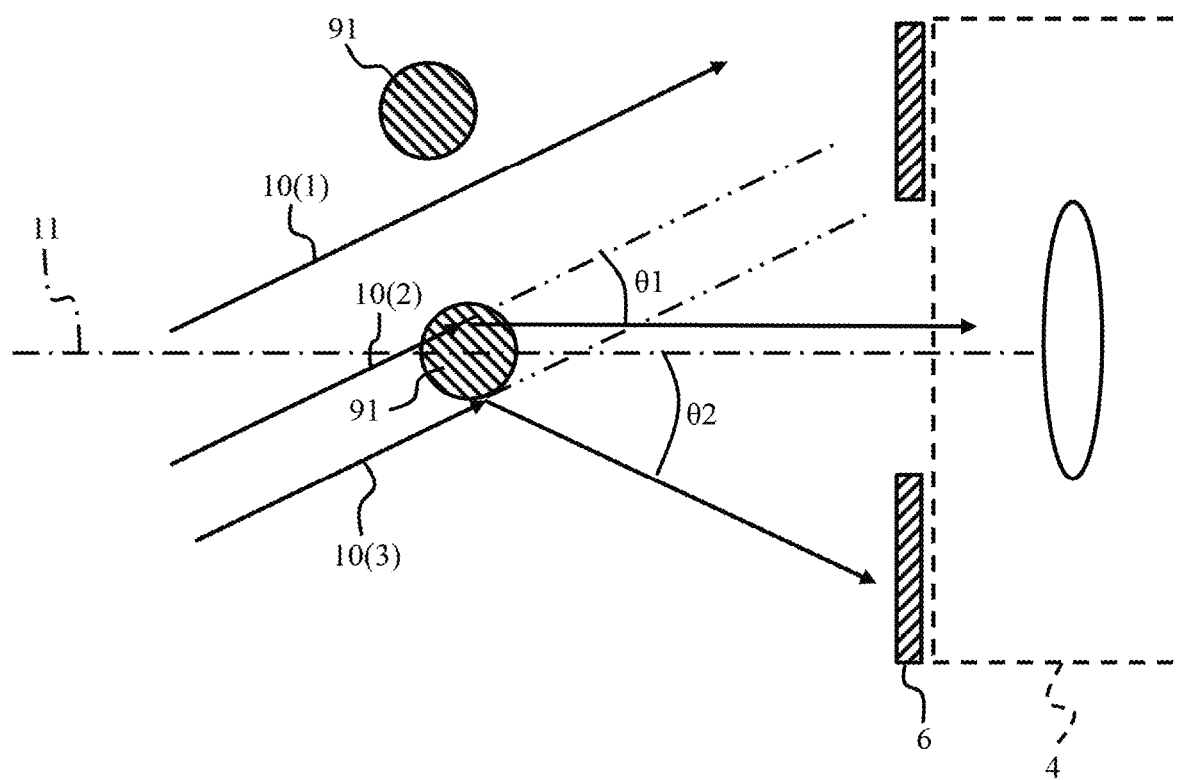
FIG. 2 is an explanatory diagram schematically illustrating a relationship between particles, parallel beam, and scattered light.

FIG. 2 is a diagram schematically illustrating a relationship between particles 91, parallel beam 10, and the optical axis 11 of the microscope 4.

When the parallel beam 10 from the light source 2 is incident on the sample 9, many parallel beams 10 pass between the particles 91 as indicated by parallel beams 10(1) in FIG. 2. Remaining parallel beams 10 are incident on the particles 91 and are scattered as indicated by parallel beams 10(2) and 10(3).

Among the parallel beams 10(2) and 10(3) scattered by the particles 91, some parallel beams 10(2) are scattered at an angle θ1 (θ1≤θth) equal to or smaller than the prescribed angle θth with respect to the optical axis 11 of the microscope 4 and are incident on the microscope 4 to reach the image capturing unit 5. The other parallel beams 10(3) are scattered at an angle θ2 (θ2>θth) exceeding the prescribed angle θth. The laser beams 10(3) scattered at an angle larger than the prescribed angle θth are not incident on the microscope 4 by being blocked by the light blocking plate 6, for example.

The light blocking plate 6 will be described with reference to FIG. 3. The light blocking plate 6 is disposed between the sample 9 and the microscope 4. The light blocking plate 6 allows only scattered light beams (scattered light beams scattered at the prescribed angle θth or smaller) within a prescribed angular range among the scattered light beams generated by the particles 91 to be incident on the microscope 4.

Figure 3:
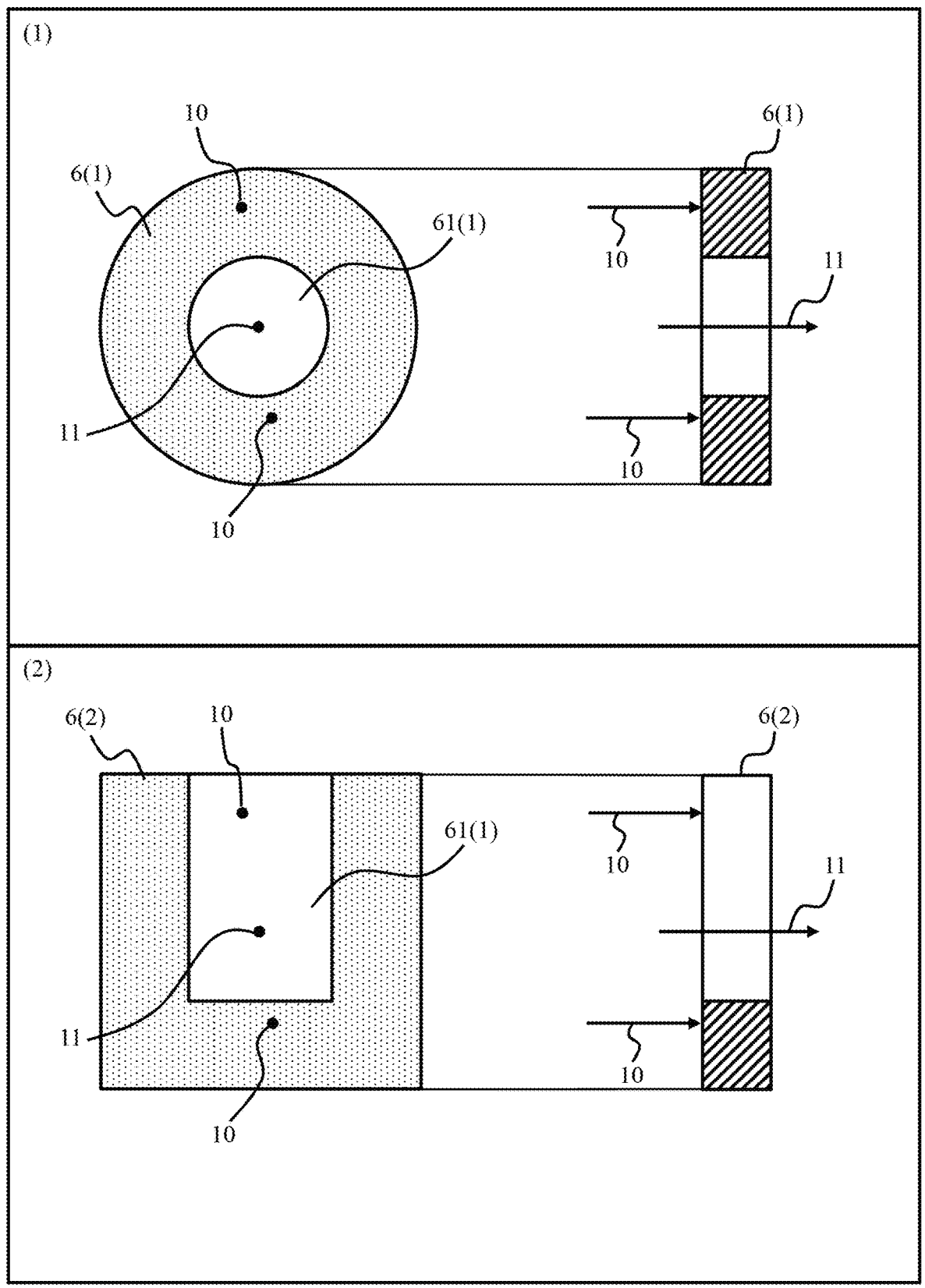
FIG. 3 is an explanatory diagram illustrating an example of a light blocking plate.

FIG. 3 illustrates an example of the light blocking plate 6 when seen from the optical axis 11 of an aperture. A light blocking plate 6(1) in FIG. 3(1) has an opening 61(1) around the optical axis 11 and is formed in a generally annular form. By using the light blocking plate 6(1), it is possible to suppress unnecessary light from being incidence on the incident portion (an aperture) of the microscope 4. Here, unnecessary light is light other than the light usable for measuring a particle size (that is, light other than the light scattered at the prescribed angle θth or smaller).

A light blocking plate 6(2) in FIG. 3(2) is formed in an approximately U-shape such that a side (the upper side in FIG. 3) close to the parallel beam 10 is open. Scattered light beams close to the optical axis of the parallel beam 10 among scattered light beams are incident on the microscope 4 through an opening 61(2). The other scattered light beams are originally not incident on the microscope 4 or are blocked by the light blocking plate 6(2). When the light blocking plate 6(2) is used, it is also possible to suppress unnecessary light from entering the microscope 4.

Figure 4:
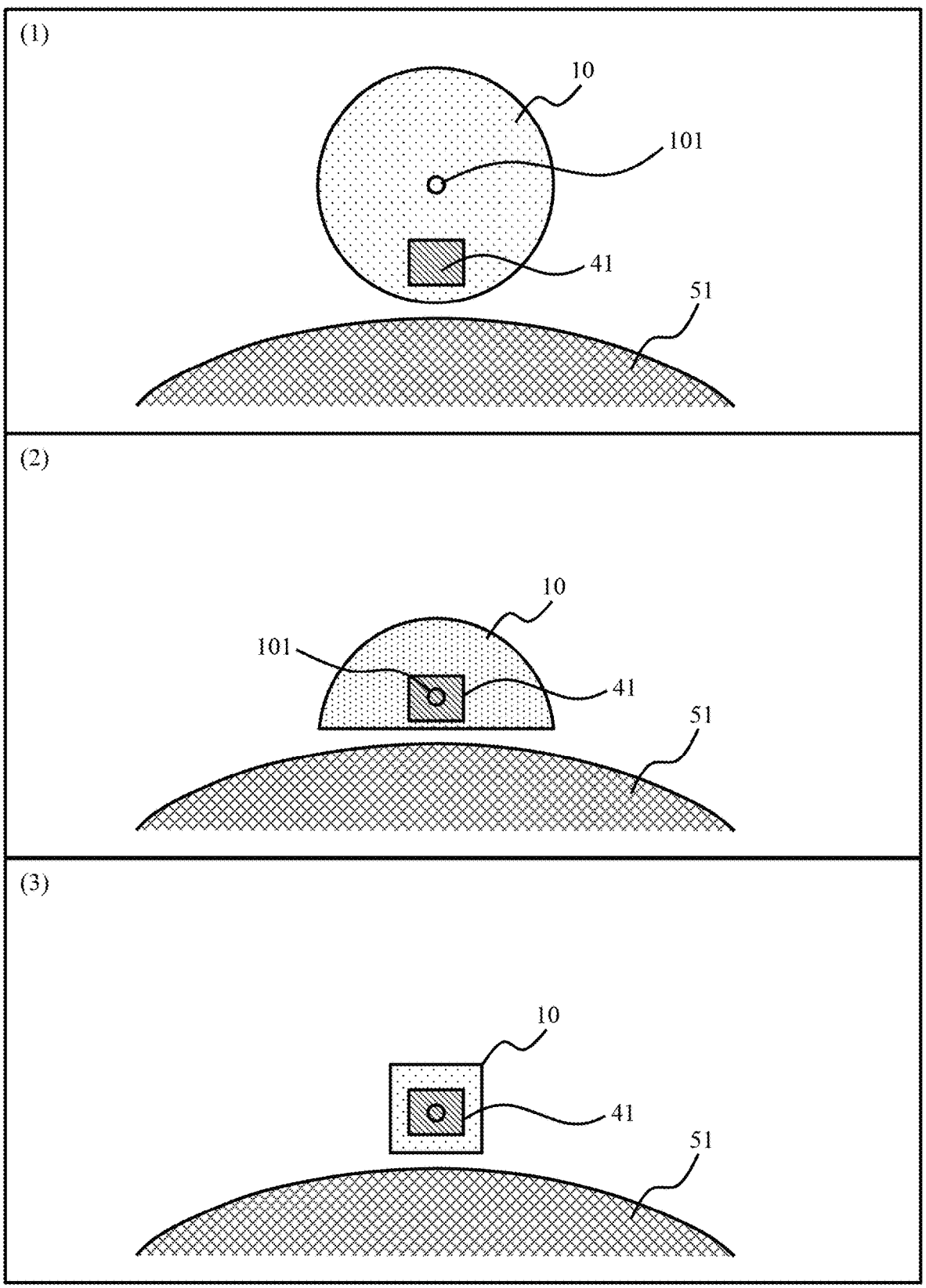
FIG. 4 is an explanatory diagram illustrating an example of a beam shape of parallel beam.

An example of a beam shape (a beam cross-section) of the parallel beam 10 will be described with reference to FIG. 4. FIG. 4 illustrates a field of view 41 of the microscope 4 in a beam cross-section and a straightly-passing component incidence range 51 which is an area in which straightly-passing components of the parallel beam 10 enter the image capturing unit 5.

FIG. 4(1) is an example of a circular beam. In the case of a circular beam, since a cross-sectional area of the parallel beam 10 is large, if the center 101 of the parallel beam 10 matches the field of view 41, the parallel beam 10 overlaps the straightly-passing component incidence range 51. Therefore, an optical system is set so that the field of view 41 is positioned at a position shifted from the cross-sectional center 101 of the parallel beam 10. In this case, an optical system of the light source 2 may be designed to include combinations of diffusers and lenses so that an optical density of the parallel beam 10 is uniform in the field of view 41.

FIG. 4(2) is an example of an approximately semi-circular beam. In this example, a portion of a cross-section of the parallel beam 10 is cut using a shielding plate or the like (not illustrated) so that the beam cross-section of the parallel beam 10 does not overlap the straightly-passing component incidence range 51. In the example illustrated in FIG. 4(2), the field of view 41 can approach the cross-sectional center 101 of the parallel beam 10 as compared to the case of FIG. 4(1). Therefore, even when an optical density of the parallel beam 10 has a centrally symmetric distribution such as a Gaussian distribution, for example, a position near the center at which the optical density is relatively uniform can match the field of view 41.

FIG. 4(3) is an example of an approximately rectangular beam. In this example, the parallel beam 10 is shaped using a shielding plate or the like (not illustrated) so that a cross-section of the parallel beam 10 is slightly larger than the field of view 41. In this way, scattered light beams resulting from particles 91 outside the field of view 41 can be suppressed from entering the microscope 4 due to multiple scattering, and images of scattered light beams from the particles 91 in the field of view 41 can be captured with a high S/N ratio.

The measuring unit 3 will be described with reference to a cross-sectional view of FIG. 5. The measuring unit 3 holds the sample 9 therein so that the parallel beam 10 is emitted toward the held sample 9. The measuring unit 3 includes a sample container 31, an observation window 33, an irradiation window 34, and an irradiation window driving unit 35, for example.

The sample container 31 is a container that holds the sample 9. The sample container 31 may be provided in a place distant from a production line (not illustrated) and the sample 9 taken out from the production line may be injected in a space 32 of the sample container 31. Alternatively, the sample container 31 may be provided in the middle of a production line and the sample 9 may be directly sent from the production line to the space 32 of the sample container 31.

The observation window 33 is a window for observing the sample 9 with the aid of the microscope 4. The observation window 33 is transparent to at least the wavelength of the parallel beam 10. An optical system is set so that a focal point of the microscope 4 is positioned near the sample-side surface of the observation window 33.

The irradiation window 34 is a window for allowing the parallel beam 10 to be emitted into the sample container 31. The irradiation window 34 is provided in the sample container 31 so as to face the observation window 33. The irradiation window 34 is transparent to at least the wavelength of the parallel beam 10. A very small gap 321 is formed between the observation window 33 and the irradiation window 34, and a portion of the sample 9 is held in the gap 321.

The irradiation window driving unit 35 controls the position of the irradiation window 34. The irradiation window 34 is moved closer to the observation window 33 and is moved away from the observation window 33 by the irradiation window driving unit 35. The irradiation window driving unit 35 may operate according to a control signal from the control unit 8 or is moved manually by a user.

Dilution and distributed processing is performed on the sample 9 as necessary so that particles do not overlap when an image of the sample 9 in the sample container 31 is captured by the microscope 4.

The parallel beam 10 enters from the irradiation window 34 and is emitted toward the sample 9. Components having passed straightly without being scattered by the particles in the sample 9 among the parallel beams 10 pass through the observation window 33 and leak outside the measuring unit 3. The microscope 4 captures the images of the components being scattered in the direction of the optical axis 11 of the microscope by the particles of the sample 9 among the parallel beams 10 through the observation window 33.

Here, the observation window 33 is preferably set to a sufficiently large size so that all straightly-passing components of the parallel beam 10 can pass therethrough. When some of the straightly-passing components of the parallel beam 10 touch the sample container 31, the straightly-passing components are reflected and scattered inside the sample container 31, and some of the reflected and scattered components enter the microscope 4 to deteriorate the imaging S/N ratio.

In the present embodiment, an example in which straightly-passing components of the parallel beam 10 pass through the observation window 33 and leaks outside the measuring unit 3 has been described. Instead of this, an inner wall of the sample container 31 may be coated with a light absorber and a light absorbing member may be provided inside the sample container 31. In this way, irregular reflection of light in the sample container 31 can be suppressed.

As described above, the irradiation window driving unit 35 moves the irradiation window 34 in the direction of the optical axis 11 of the microscope 4. The irradiation window 34 is moved closer to the observation window 33 during measurement so that the thickness of the sample 9 in the direction of the optical axis 11 is decreased to minimize the area (volume) of the sample 9 irradiated with the parallel beam 10. In this way, it is possible to suppress overlapping of particles when imaging the sample 9 using the microscope 4 and to suppress influence of scattered light due to particles outside the focal position of the microscope 4. Furthermore, since movement of particles is suppressed when the irradiation window 34 is moved as closer as possible to the observation window 33, it is possible to suppress blurring during imaging.

When the imaging of the microscope 4 ends, the irradiation window 34 is moved away from the observation window 33 by the irradiation window driving unit 35. After the irradiation window 34 is separated from the observation window 33, the sample 9 in the sample container 31 may be replaced.

An optical system of the microscope 4 described in FIG. 1 is designed so that an objective-side focal position is aligned at the sample 9 and images of scattered light beams from respective particles can be captured by the image capturing unit 5 of the microscope 4. Furthermore, in the microscope 4 of the present embodiment, a focal distance and a lens diameter are set so that the straightly-passing components of the parallel beam 10 are suppressed from entering the image capturing unit 5.

FIG. 6 illustrates an image example obtained by imaging alumina particles. FIG. 6(1) illustrates a scattered light image and FIG. 6(2) is an explanatory diagram schematically illustrating a scattered light image. The schematic diagram of FIG. 6(2) is for description of a scattered light image and does not correspond directly to the image of FIG. 6(1).

Respective points in FIG. 6 illustrate scattered light beams from respective particles. In the present embodiment, the microscope 4 is set such that a focal distance with respect to a lens diameter is as large as possible in order to capture the images of components (components of which the angle from the optical axis 11 is equal to or smaller than the prescribed angle θth) substantially parallel to the optical axis 11 among the scattered light beams.

The image processing unit 7 described in FIG. 1 recognizes respective particles 91 from an image captured by the image capturing unit 5, acquires a scattered light intensity of each of the particles, and calculates a particle size on the basis of the scattered light intensity.

The image processing unit 7 acquires a value corresponding to a pixel having the highest brightness value among a group of pixels corresponding to each of the particles as a scattered light intensity of the particle. Alternatively, the image processing unit 7 may use a peak intensity of a curve obtained by performing fitting using a Gaussian distribution or the like as a scattered light intensity.

Furthermore, the image processing unit 7 prepares a correspondence between a scattered light intensity and a particle size for a material of the sample 9 in advance as a relational expression or a database and calculates a particle size using the relational expression or the database.

When a scattered light intensity deviates from a brightness range of a captured image, the output of the light source 2 may be adjusted, the exposure time of the image capturing unit 5 may be adjusted, and the gain of the image capturing unit 5 may be adjusted. In this way, a scattered light intensity falls within a brightness range. In a fourth embodiment to be described later, the output of the second light source 18 may be adjusted according to the property of the sample 9.

When scattered light intensity is different greatly from particle to particle, and scattered light intensities of all particles do not fall within a brightness range, imaging is performed a plurality of times while changing the output of the light source 2, the exposure time or the gain of the image capturing unit 5.

Figure 7:
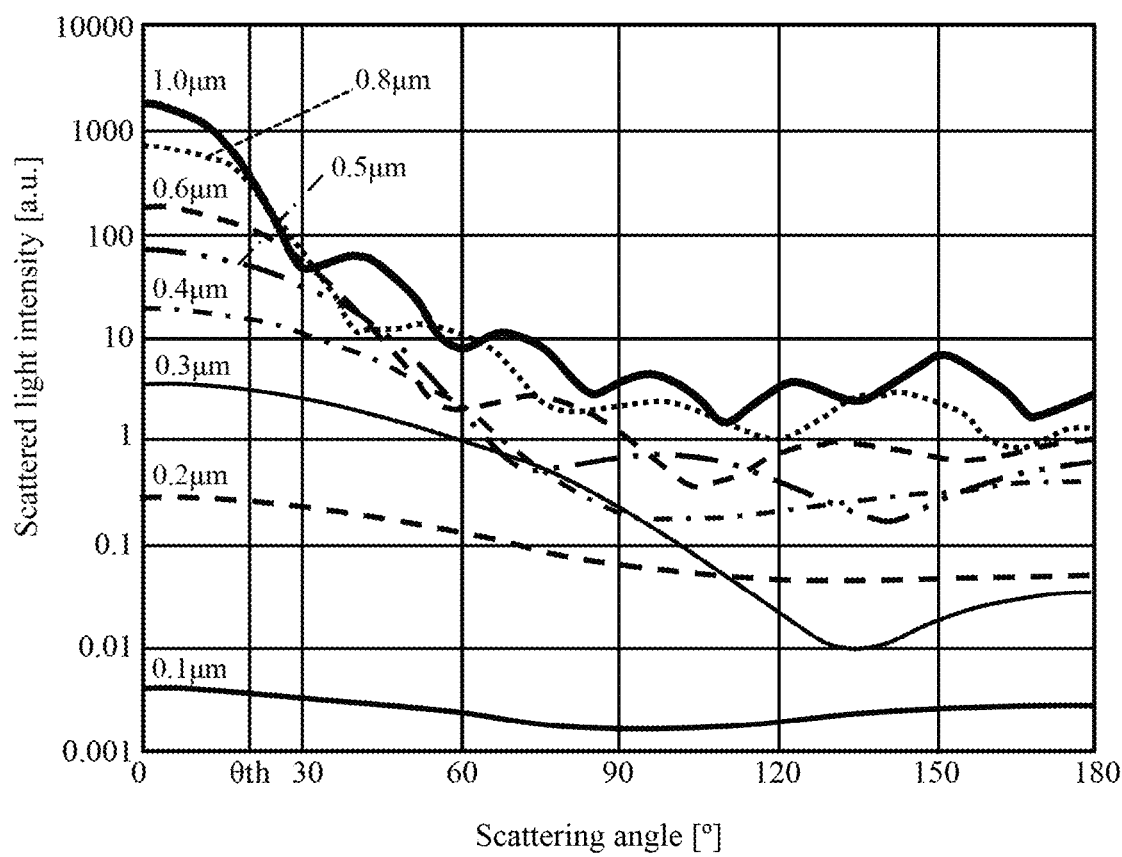
FIG. 7 is a characteristic diagram illustrating characteristics of a scattered light intensity with respect to a scattering angle and a particle size.

The reason why it is possible to recognize small particles of 1 μm or smaller and calculate the particle size thereof in the present embodiment will be described. A scattered light intensity of light due to a particle can be calculated by the Mie scattering theory. FIG. 7 illustrates a calculation result of a scattered light intensity for alumina particles.

In the characteristic diagram of FIG. 7, a horizontal axis indicates a scattering angle. A vertical axis of FIG. 7 indicates a calculation value of scattered light intensities for some particle sizes (for example, 10 μm, 0.8 μm, 0.6 μm, 0.4 μm, 0.3 μm, 0.2 μm, and 0.1 μm).

A scattered light intensity exhibits a complex behavior with respect to a scattering angle due to optical interference or the like in a particle. However, it was understood that, when focusing on a range of scattering angles of a prescribed angle θth or smaller, a scattered light intensity increases monotonously as a particle size increases. Therefore, in the present embodiment, using the relationship illustrated in FIG. 7, a particle size is calculated uniquely from a scattered light intensity in a small angle scattering range (a range of the prescribed angle θth or smaller) in which a scattered light intensity changes monotonously with respect to a particle size.

According to the present embodiment configured in this manner, it is possible to measure the size and the position of the particle 91 on the basis of the intensity of scattered light scattered from the particle 91 at the prescribed angle θth or smaller from the optical axis of the parallel beam 10. Therefore, it is possible to measure particles having a smaller size than the conventional technique in which a shadow image of the particle 91 is measured using a transmission optical system.

In the present embodiment, an example of an optical system in which straightly-passing components of the parallel beam 10 are not incident on the image capturing unit 5 has been described. Instead of this, a polarizing filter may be provided between the sample 9 and the image capturing unit 5 and a polarized light source may be used as the light source 2. As the polarized light source, a laser light source having polarizing properties, a combination of a polarizing filter and the light source 2, and the like may be used, for example. With a combination of a polarized light source and a polarizing filter, it is possible to prevent the straightly-passing components of the parallel beam 10 from entering the image capturing unit 5.

Second Embodiment

A second embodiment will be described with reference to FIGS. 8 to 10. In the embodiments to be described later, differences from the first embodiment will be described mainly. In the present embodiment, the range of measurable particle sizes is expanded by measuring a particle size on the basis of a particle shape image in addition to measuring a particle size on the basis of a scattered light intensity.

Figure 8:
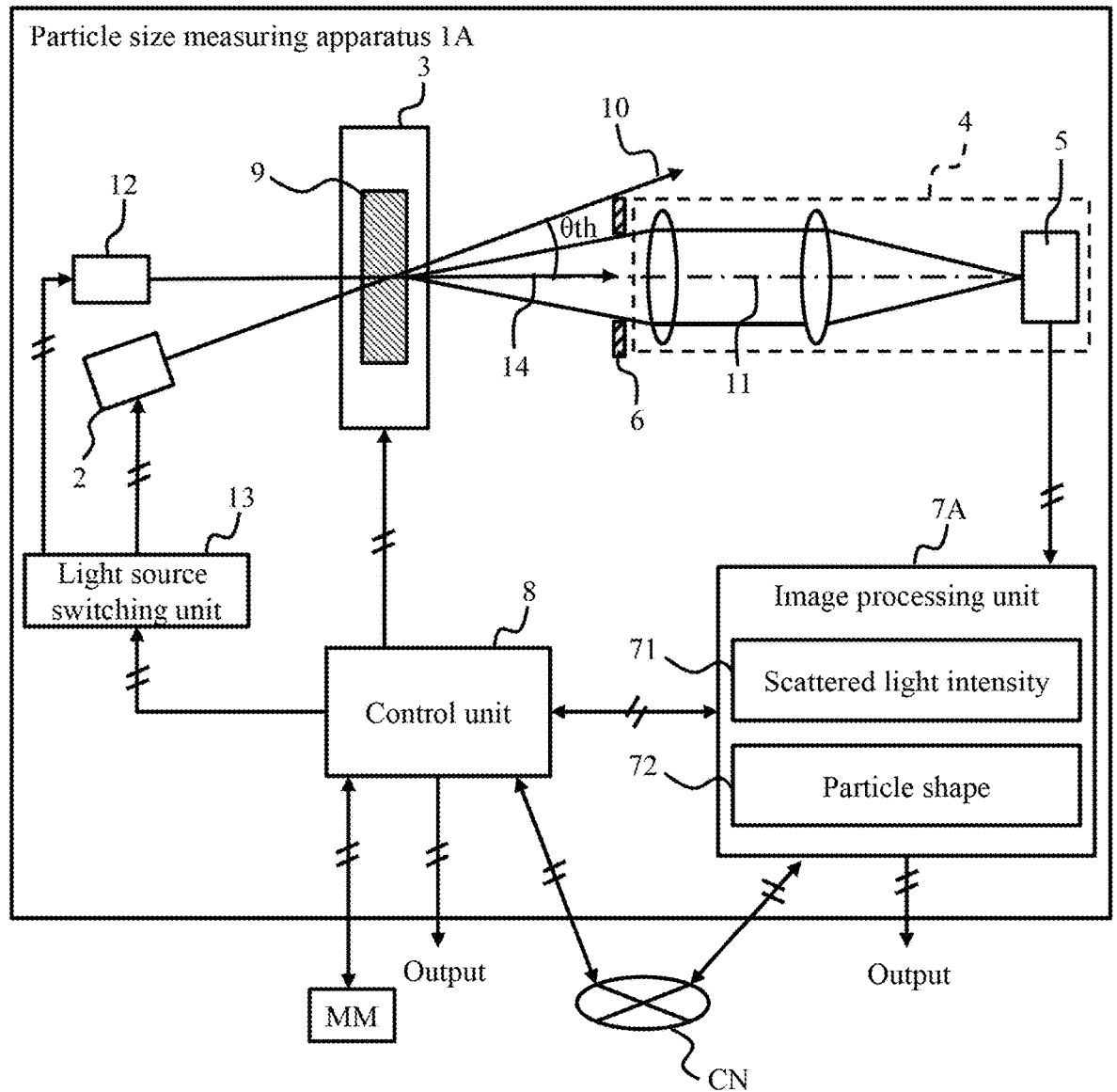
FIG. 8 is a diagram illustrating a configuration of a particle size distribution measuring apparatus according to a second embodiment.
Figure 9:
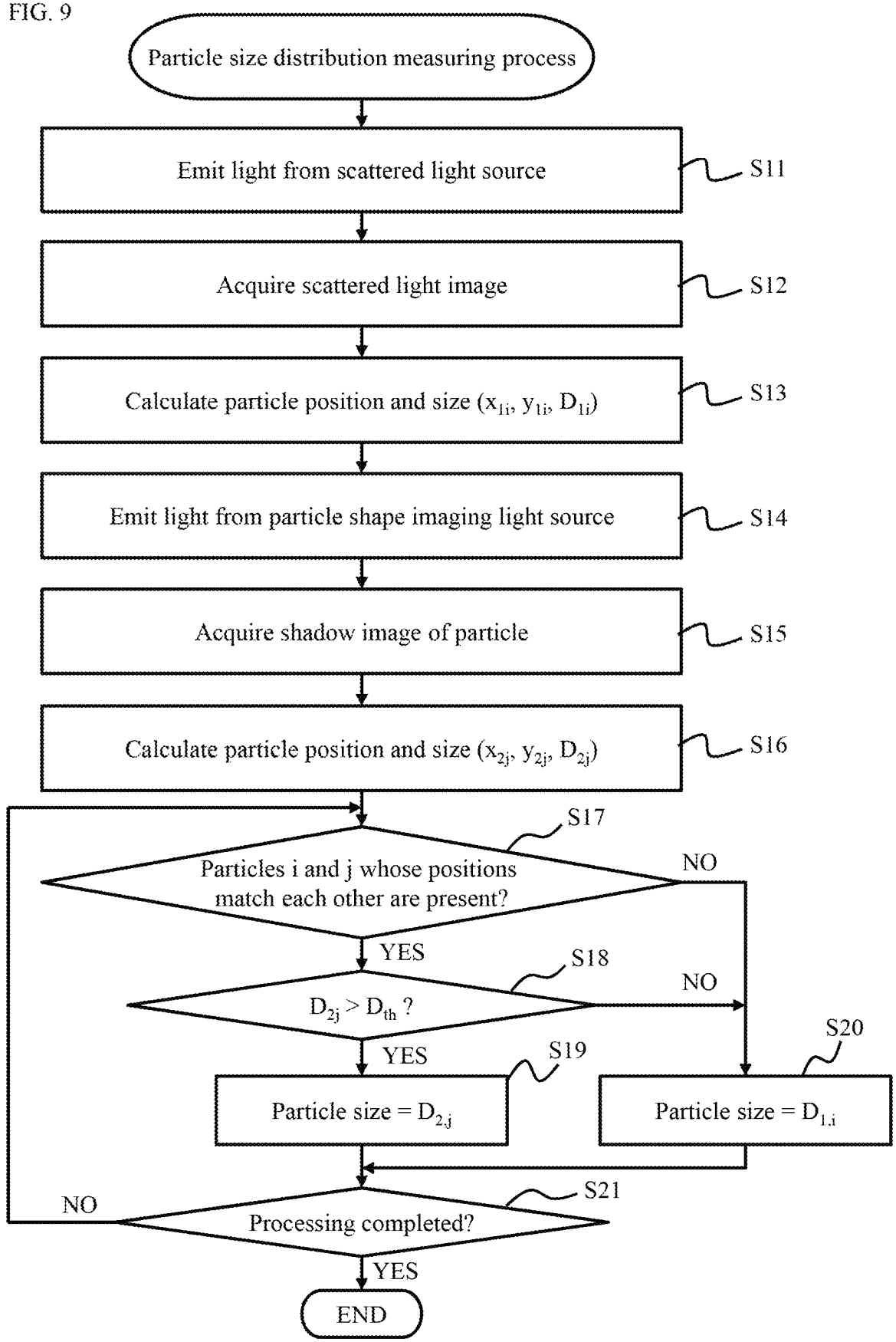
FIG. 9 is a flowchart of a particle size distribution measuring process.

FIG. 8 illustrates a configuration of a particle size distribution measuring apparatus 1A according to the present embodiment. The particle size distribution measuring apparatus 1A further includes a particle shape imaging light source 12 and a light source switching unit 13 as compared to the particle size distribution measuring apparatus 1 described in FIG. 1. Furthermore, an image processing unit 7A of the particle size distribution measuring apparatus 1A measures a particle size on the basis of a plurality of measurement algorithms 71 and 72.

The particle shape imaging light source 12 which is an example of "second light source" emits parallel beam 14 toward the sample 9 held by the measuring unit 3. An optical axis of the parallel beam 14 is set to substantially match the optical axis 11 of the microscope 4.

The light source switching unit 13 switches between the light source 2 and the light source 12 according to a control signal (a switching signal) from the control unit 8. The light source switching unit 13 emits parallel beam 10 or parallel beam 14 toward the sample 9 by alternately using the light source 2 and the particle shape imaging light source 12.

When the parallel beam 10 from the light source 2 is emitted toward the sample 9, similarly to the first embodiment, the image capturing unit 5 captures an image of scattered light scattered at the prescribed angle θth or smaller from particles. A particle size measurement processing unit 71 based on the scattered light intensity of the image processing unit 7 recognizes respective particles from the scattered light image captured by the image capturing unit 5 and calculates a particle size from the scattered light intensity.

In contrast, when the parallel beam 14 from the particle shape imaging light source 12 is emitted toward the sample, the image capturing unit 5 captures a shadow image of particles. A particle size measurement processing unit 72 based on the particle shape image of the image processing unit 7 recognizes respective particles on the basis of the shadow image of the particle 91 generated by the parallel beam 14 and calculates a particle size from the size of the shadow image.

A particle size distribution measuring process will be described with reference to the flowchart of FIG. 9. The particle size distribution measuring apparatus 1A (hereinafter sometimes abbreviated to as a measuring apparatus 1A) emits parallel beam 10 from the light source 2 toward the sample 9 (S11) and acquires an image of scattered light scattered at the prescribed angle θth or smaller from the image capturing unit 5 (S12).

The measuring apparatus 1A identifies respective particles from the scattered light image and calculates the position $(x_{1i}, y_{1i})$ and the size $D_{1i}$ of each of the identified particles i (S13).

Subsequently, the measuring apparatus 1A switches the light source 2 to the particle shape imaging light source 12 and emits parallel beam 14 from the particle shape imaging light source 12 toward the sample 9 (S14) and acquires a shadow image of particles from the image capturing unit 5 (S15). The measuring apparatus 1A identifies respective particles from the particle shape image and calculates the position $(x_{2j}, y_{2j})$ and the size $D_{2j}$ of each of the identified particles j (S16).

The measuring apparatus 1A compares the position of the particle j obtained from the shadow image with each of the particles i obtained from the scattered light image to determine whether the particles are the same particle (S17). That is, the particle size distribution measuring apparatus 1A determines whether particles i and j whose positions match each other are present.

When the same particle is detected (S17: YES), the measuring apparatus 1A determines whether the size $D_{2j}$ of the particle j determined to be the same is larger than a prescribed threshold Dth (S18).

When a comparison result shows that the particle size $D_{2j}$ of the shadow image is larger than the threshold Dth (S18: YES), the measuring apparatus 1A determines that the size of the particle detected in step S17 is "$D_{2j}$" (S19). In other case (S18: NO), the measuring apparatus 1A determines that the size of the particle detected in step S17 is "$D_{1i}$" (S20).

The measuring apparatus 1A repeats steps S17 to S20 for all particles i identified from the scattered light image (S21). When the particle sizes are determined for all particles i (S21: YES), this process ends.

The reason why the range of measurable particle sizes can be expanded in the present embodiment will be described. As described in FIG. 7, at the prescribed scattering angle θth or smaller, a scattered light intensity increases monotonously as the particle size increases. However, when the particle size is increased further, the scattered light intensity reaches its maximum and then starts decreasing.

Figure 10:
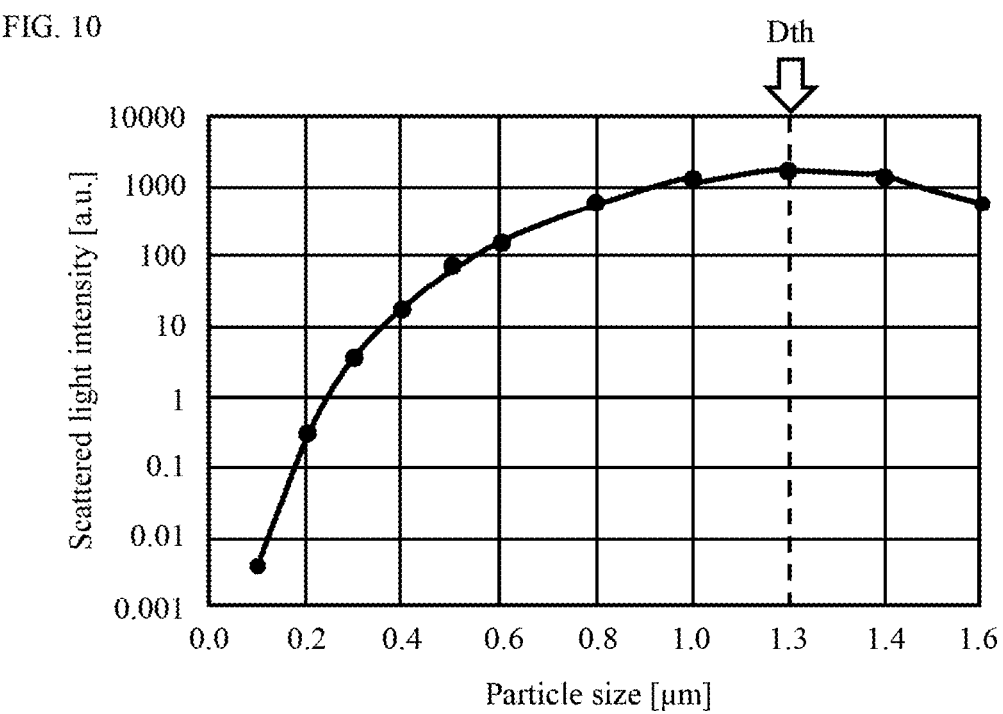
FIG. 10 is a characteristic diagram illustrating a relationship between a particle size and a scattered light intensity.

FIG. 10 illustrates a relationship between a particle size and a scattered light intensity at a scattering angle of 10° for alumina particles. Although the scattered light intensity increases with the particle size of up to "1.2 μm", the scattered light intensity decreases if the particle size increases further. In this case, since a plurality of particle sizes corresponds to one scattered light intensity, it is not possible to determine the particle size uniquely. In the example of FIG. 10, since the scattered light intensity of the particle size of "1.0 μm" is substantially the same as the scattered light intensity of the particle size of "1.4 μm", it is not possible to determine the particle size on the basis of the scattered light intensity only.

On the other hand, when the particle size exceeds "1.0 μm", it is possible to recognize particles using a shadow image obtained by the particle shape imaging light source 12. Therefore, in the present embodiment, as described in FIG. 10, a threshold Dth of a particle size is set, and the range of measurable particle sizes is expanded selectively using the particle size obtained from a scattered light image and the particle size obtained from a shadow image.

A plurality of methods for setting the threshold Dth may be used. One method is to set the threshold on the basis of a limit value in which a particle size can be recognized from a shadow image. Another method is to set the threshold on the basis of a particle size in which a scattered light intensity cannot be determined uniquely when it is possible to predict the characteristics of a scattered light intensity of a measurement target in advance.

According to the present embodiment configured in this manner, effects similar to those of the first embodiment are obtained. Furthermore, in the present embodiment, parallel beam is emitted toward the sample 9 alternately using the light source 2 and the particle shape imaging light source 12 to acquire a scattered light image and a particle shape image, and a particle size is determined by combining these images. Therefore, a measurable particle size can be expanded more than the first embodiment and the usability is improved.

The wavelength of the light source 2 and the wavelength of the particle shape imaging light source 12 may be different and the image capturing unit 5 may be configured to detect light in respective wavelength ranges. The image capturing unit 5 may be configured to detect light in respective wavelength ranges similarly to a color CCD, for example, to acquire images corresponding to the wavelength of the parallel beam from the light source 2 and the wavelength of the parallel beam from the particle shape imaging light source 12. In this case, it is possible to acquire a scattered light image and a shadow image of particles continuously and simultaneously without switching a light source and to measure a particle size at a high speed.

Third Embodiment

A third embodiment will be described with reference to FIG. 11. In the present embodiment, an example of shortening a measurement time as compared to the particle size distribution measuring apparatus LA described in the second embodiment will be described.

Figure 11:
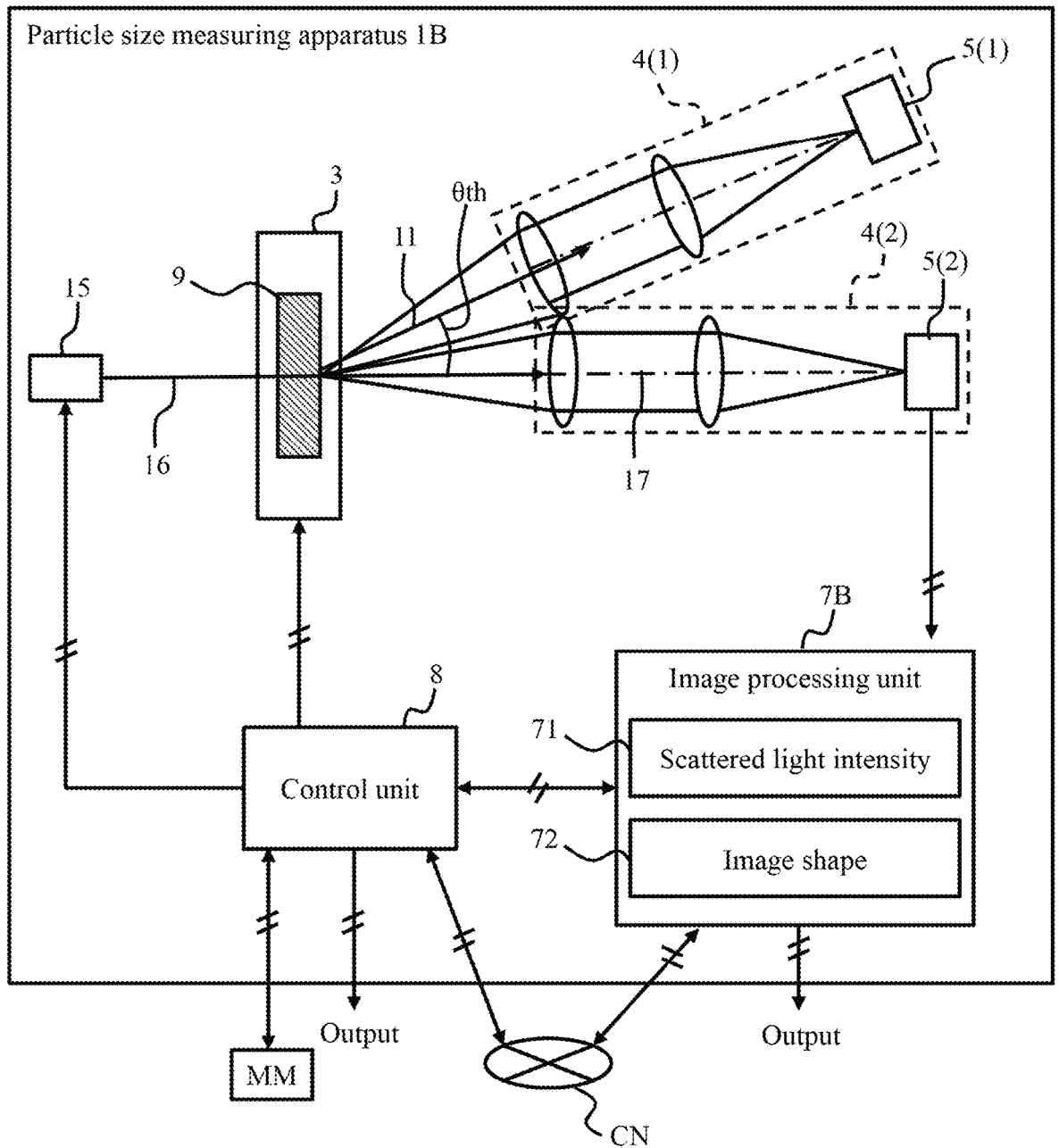
FIG. 11 is a diagram illustrating a configuration of a particle size distribution measuring apparatus according to a third embodiment.

FIG. 11 illustrates a configuration of a particle size distribution measuring apparatus 1B according to the present embodiment. The particle size distribution measuring apparatus 1B further includes a plurality of microscopes 4(1) and 4(2) as compared to the measuring apparatus 1 described in FIG. 1. A relationship between the light source 2 and the microscope 4 illustrated in FIG. 1 corresponds to a relationship between a light source 15 and a first microscope 4(1) illustrated in FIG. 11.

That is, the first microscope 4(1) captures an image of scattered light scattered at the prescribed angle θth or smaller from particles to obtain a scattered light image similarly to the microscope 4 described in the first embodiment. The second microscope 4(2) captures a shadow image of particles.

Here, the optical axis 11 of the first microscope 4(1) is shifted by the prescribed angle θth with respect to the optical axis of the parallel beam 16 from the light source 15. An optical axis 17 of the second microscope 4(2) substantially matches the optical axis of the parallel beam 16 from the light source 15. Furthermore, a focal position of the first microscope 4(1) and a focal position of the second microscope 4(2) substantially match each other.

An optical system of the first microscope 4(1) is designed so that an image capturing unit 5(1) can image scattered light beams from respective particles. Furthermore, in the first microscope 4(1), a focal distance and a lens diameter are set so that straightly-passing components of the parallel beam 16 are not incident on the image capturing unit 5(1). The first microscope 4(1) is preferably designed such that a focal distance with respect to a lens diameter is as large as possible in order to capture the images of components parallel to the optical axis 11 among the scattered light beams.

As described above, the second microscope 4(2) is disposed so as to face the light source 15 with the measuring unit 3 disposed therebetween, and the optical axis of the light source 15 and the optical axis 17 of the second microscope 4(2) substantially match each other. In this way, in the second microscope 4(2), the shadow image of particles is captured by the image capturing unit 5(2).

An image processing unit 7B calculates a particle size on the basis of the scattered light image acquired from the first microscope 4(1) and the particle shape image acquired from the second microscope 4(2). Since a method of calculating the particle size is the same as that described in FIG. 9, the description thereof will be omitted.

As described above, in the present embodiment, the parallel beam 16 is emitted from the light source 15, a scattered light image is captured by the first microscope 4(1), and a shadow image is captured by the second microscope 4(2). The imaging of the first microscope 4(1) and the imaging of the second microscope 4(2) may be performed continuously and may be performed simultaneously.

According to the present embodiment, the effects similar to those of the first and second embodiments are obtained. Furthermore, in the present embodiment, since the light source 15 can be used continuously rather than switching the light sources 2 and 12 as in the second embodiment, it is possible to acquire a scattered light image and a particle shape image at a high speed and to shorten the measurement time. As a result, the performance and the usability of the measuring apparatus 1B are improved.

Fourth Embodiment

A fourth embodiment will be described with reference to FIGS. 12 to 15. In the present embodiment, an application range of materials is expanded as compared to the particle size distribution measuring apparatus 1 described in the first embodiment.

Figure 12:
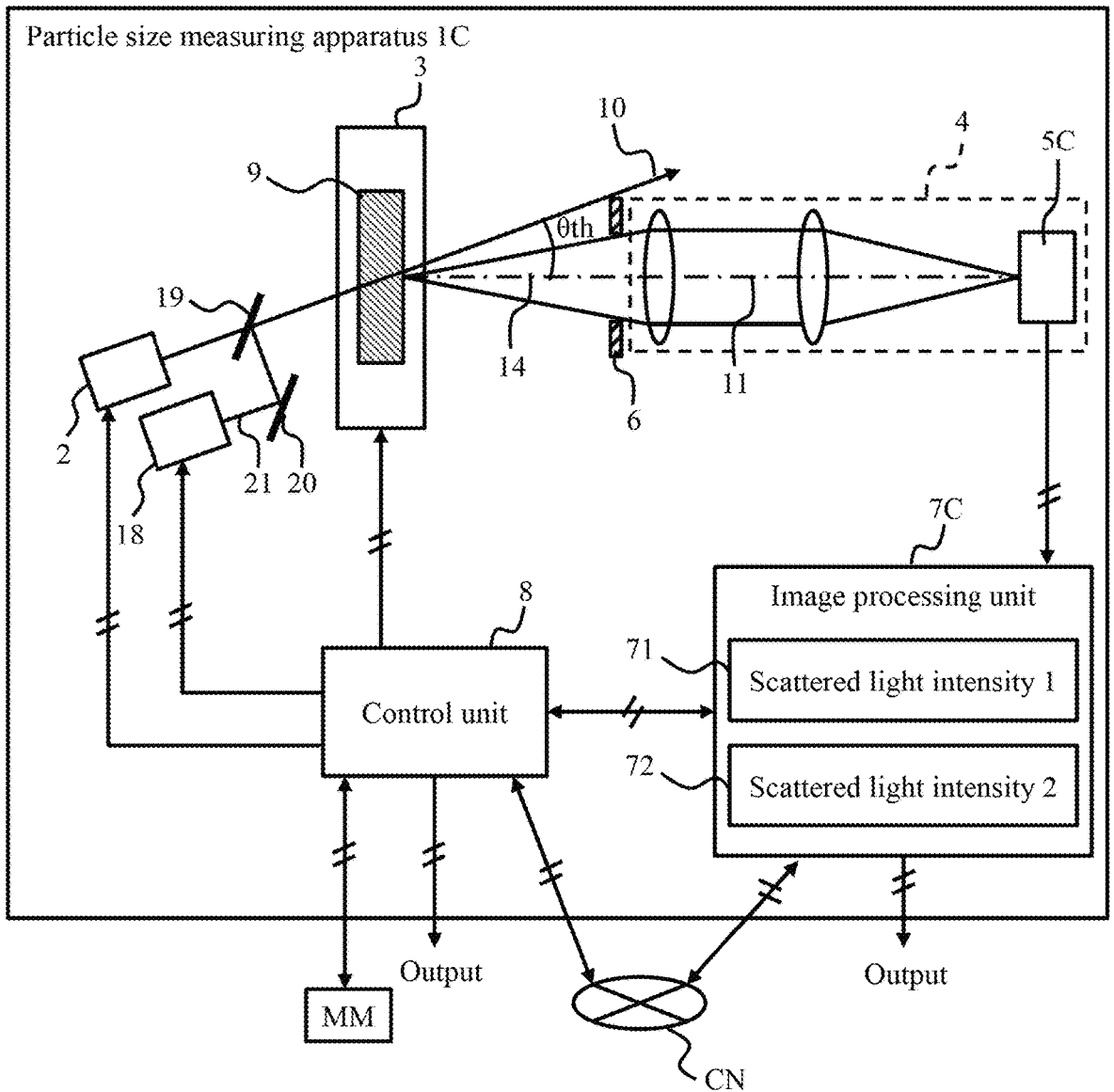
FIG. 12 is a diagram illustrating a configuration of a particle size distribution measuring apparatus according to a fourth embodiment.

FIG. 12 illustrates a configuration of a particle size distribution measuring apparatus 1C of the present embodiment. The particle size distribution measuring apparatus 1C further includes a third light source 18, a wavelength selection mirror 19, and a mirror 20 as compared to the particle size distribution measuring apparatus 1 described in FIG. 1. Furthermore, an image processing unit 7C of the particle size distribution measuring apparatus 1C measures a particle size on the basis of a plurality of measurement algorithms 71 and 72.

The third light source 18 has an output wavelength different from that of the light source 2 and emits parallel beam 21 toward the sample 9 held by the measuring unit 3 via the wavelength selection mirror 19 and the mirror 20. An optical axis of the parallel beam 21 is set to substantially match the optical axis 10 of the light source 2.

The wavelength selection mirror 19 is designed to allow light from the light source 2 to pass therethrough and reflect light from the third light source 18.

An image capturing unit 5C splits incident light into a plurality of wavelength ranges and captures images corresponding to respective wavelength ranges. For example, a color CCD (Charge Coupled Device) that splits light into RGB can be used as the image capturing unit 5C.

In the present embodiment, the wavelength of the light source 2 and the wavelength of the third light source 18 correspond to the respective spectral wavelength ranges of the image capturing unit 5C so that the images of scattered light beams obtained from the parallel beams from the respective light sources being scattered by the sample 9 are captured by the image capturing unit 5C. For example, when the image capturing unit 5C is a color CCD that splits light into RGB, an output wavelength of the light source 2 corresponds to red and scattered light of the red light is imaged by R pixels of the image capturing unit 5C whereas an output wavelength of the third light source 18 corresponds to blue and scattered light of the blue light is imaged by B pixels of the image capturing unit 5C.

Figure 13:
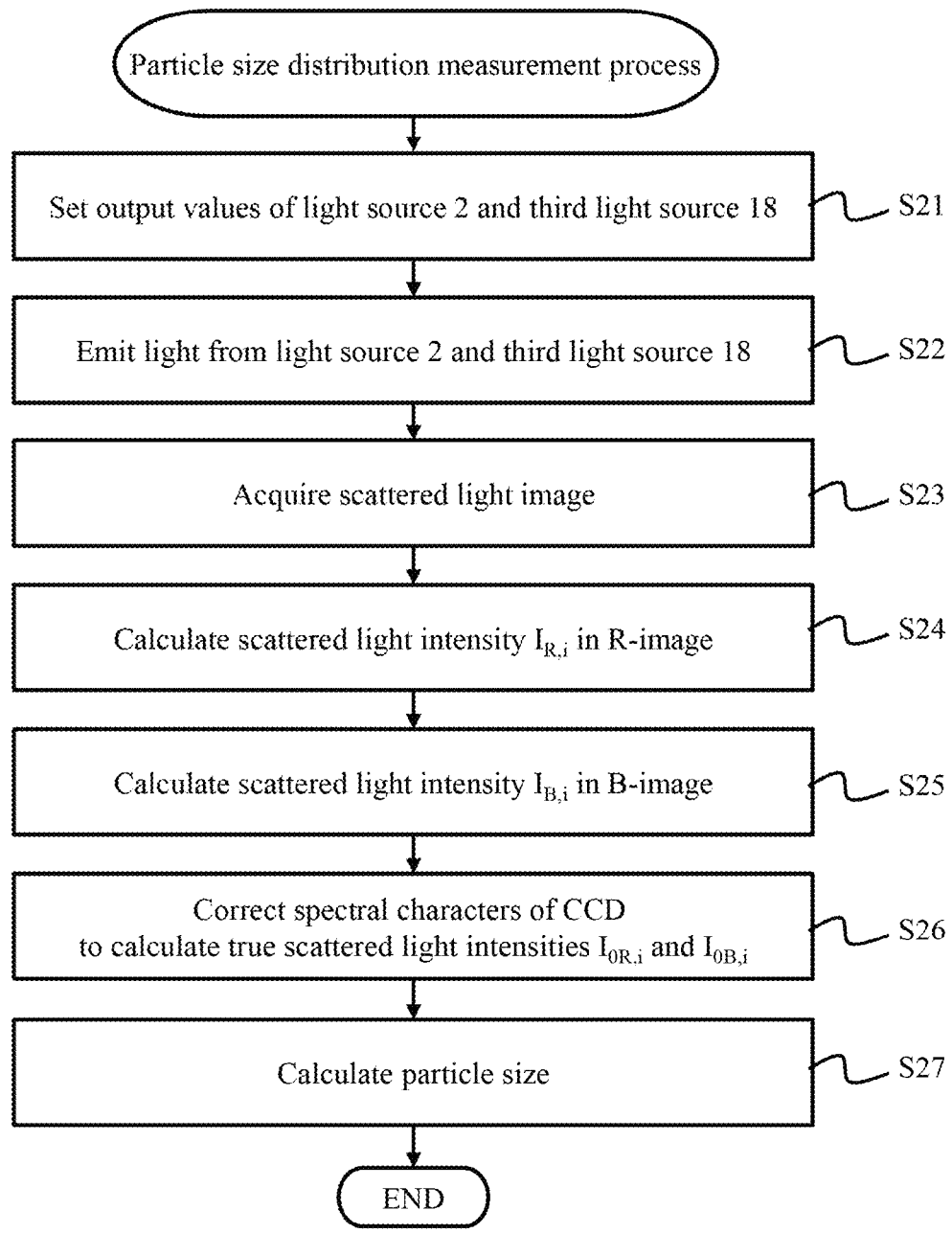
FIG. 13 is a flowchart of a particle size distribution measuring process.

A particle size distribution measuring process will be described with reference to the flowchart of FIG. 13. First, the particle size distribution measuring apparatus 1C sets the output values of the light source 2 and the third light source 18 so that the corresponding scattered light intensities are approximately equal to each other (S21). As a method of setting the output value, the output values may be input manually, and the output values may be calculated automatically on the basis of a prediction value of a scattered light intensity prepared in advance as a relational expression or a database.

Subsequently, parallel beams 10 and 21 are emitted from the light source 2 and the third light source 18 toward the sample 9 (S22) whereby images (color images) of scattered light beams scattered at the prescribed angle θth or smaller are acquired from the image capturing unit 5C (S23).

The particle size distribution measuring apparatus 1C extracts a monochrome image captured by R pixels and a monochrome image captured by B pixels from the captured color images. The image processing unit 7C identifies respective particles from the extracted monochrome images and acquires a value corresponding to a pixel having the highest brightness value among a group of pixels corresponding to each of the particles as scattered light intensities $I_{R,i}$ and $I_{B,i}$ of the particle (S24 and S25). Alternatively, the image processing unit 7C may use a peak intensity of a curve obtained by performing fitting using a Gaussian distribution or the like as a scattered light intensity.

Subsequently, the image processing unit 7C corrects spectral characteristics of the CCD from the scattered light intensities $I_{R,i}$ and $I_{B,i}$ acquired from the monochrome images to calculate true scattered light intensities $I_{OR,i}$ and $I_{OB,i}$ (S26). For example, although an ordinary color CCD splits light using color filters, a cutting percentage for light other than a prescribed wavelength range is not 100% and a very small amount of light passes therethrough. Therefore, for example, when the intensity of scattered light corresponding to the light from the light source 2 is high, the light is detected by the B pixels of the image capturing unit 5C. Due to this, the acquired scattered light intensity $I_{B,i}$ is the sum of components which are not cut by filters among the scattered light corresponding to the third light source 18 and the scattered light corresponding to the light from the light source 2. In this case, when the true scattered light intensities corresponding to the respective light sources are $I_{0R,i}$ and $I_{0B,i}$, the scattered light intensities $I_{R,i}$ and $I_{B,i}$ acquired from the images are represented by Formulas 1 and 2 below.

$$I_{R,i} = I_{0R,i} + a \times I_{0B,i} \quad \text{Formula 1}$$

$$I_{B,i} = I_{0B,i} + b \times I_{0R,i} \quad \text{Formula 2}$$

Here, "a" is a value obtained by dividing the light intensity acquired by R pixels when light was emitted by the third light source 18 only by the light intensity acquired by B pixels. "b" is a value obtained by dividing the light intensity acquired by B pixels when light was emitted by the light source 2 only by the light intensity acquired by R pixels. These values a and b are measured and acquired using a standard sample or the like in advance. The true scattered light intensities corresponding to the respective light sources are obtained by solving Formulas 1 and 2.

Subsequently, the particle size distribution measuring apparatus 1C prepares correspondences between a scattered light intensity and a particle size for a material of the sample 9 at the wavelengths of the respective light sources in advance as relational expressions or databases and calculates a particle size from the calculated true scattered light intensities corresponding to the respective light sources (S27). For example, when the scattered light intensities at the respective particle sizes (d) prepared in advance are $I_{R(d)}$ and $I_{B(d)}$, d that minimizes the value of Formula 3 below is calculated and it is determined that the calculated value of d is the particle size.

$$(I_{0R,T} - I_R(d))^2 + (I_{0B,T} - I_B(d))^2 \quad \text{Formula 3}$$

The reason why an application range of materials can be expanded in the present embodiment will be described. In the example of the alumina illustrated in FIG. 10, the scattered light intensity increases monotonously with the particle size of up to 1.2 µm as the particle size increases. However, when a material having a higher refractive index is used, the upper limit of the particle size in which the scattered light intensity increases monotonously decreases.

Figure 14:
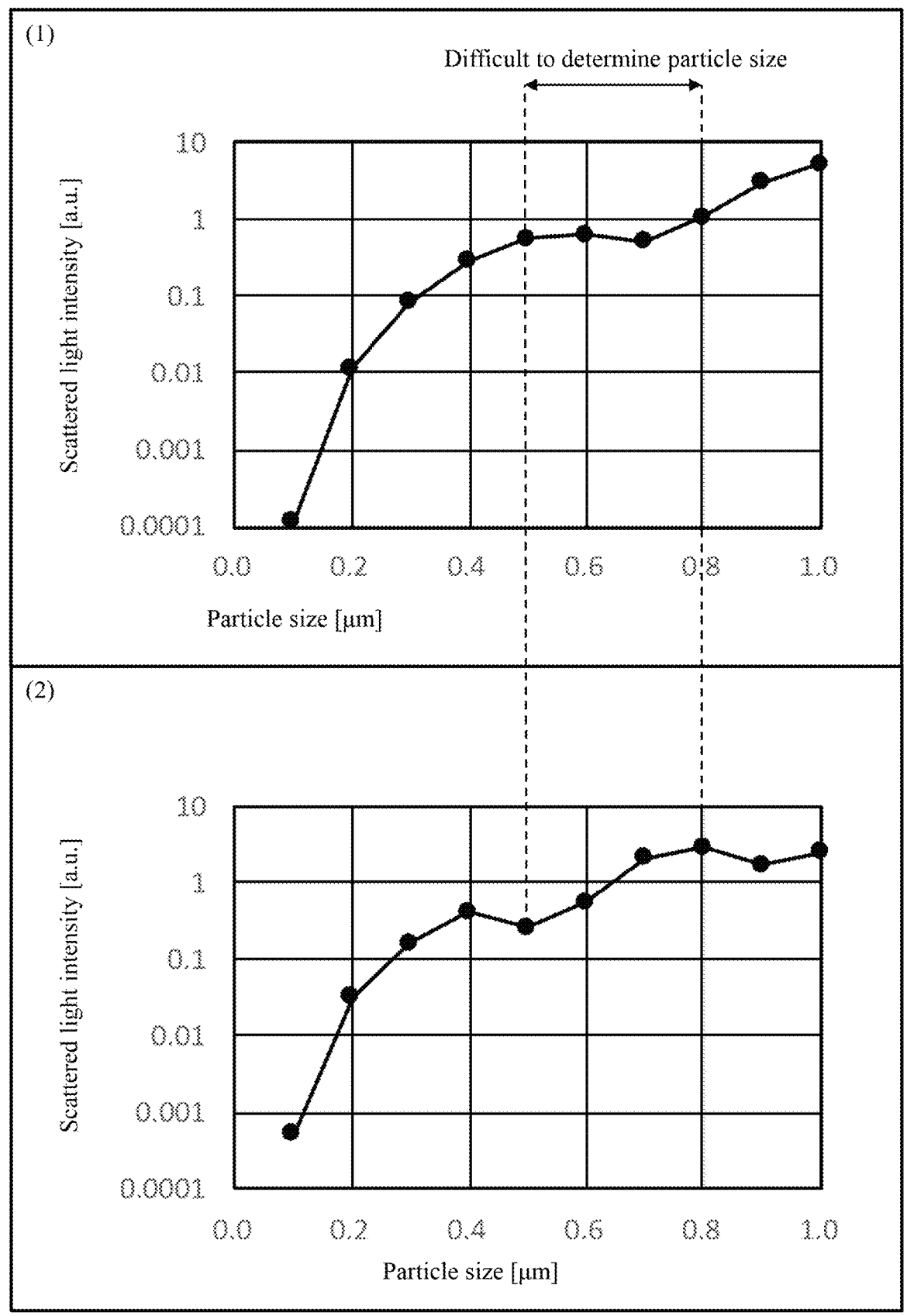
FIG. 14 is a characteristic diagram illustrating a relationship between a particle size and a scattered light intensity when a wavelength of parallel beam is changed.

FIG. 14(1) illustrates a relationship between a particle size and a scattered light intensity at a scattering angle of 10° when light having the wavelength of 635 nm (red) was emitted toward barium titanate particles. Although the scattered light intensity increases with the particle size of up to "0.5 µm", the scattered light intensity decreases when the particle size increases further. In this case, since a plurality of particle sizes corresponds to one scattered light intensity, it is not possible to determine the particle size uniquely. In the example of FIG. 14(1), it is not possible to determine the particle size in a range of particle sizes from 0.5 µm to 0.8 µm.

On the other hand, FIG. 14(2) illustrates a relationship between a particle size and a scattered light intensity at a scattering angle of 10° when light having the wavelength of 455 nm (blue) was emitted toward barium titanate particles. The shape of a curve of a scattered light intensity with respect to a particle size in FIG. 14(2) is different from that of FIG. 14(1). In FIG. 14(2), the scattered light intensity increases monotonously in a range from 0.5 µm to 0.8 µm in which the scattered light intensity tends to decrease in FIG. 14(1). Therefore, it is possible to determine the particle size using the scattered light intensity corresponding to the light source having the wavelength of 455 nm.

In the present embodiment, an example in which light is emitted toward the sample 9 in a state in which the optical axis of the parallel beam 10 from the light source 2 matches the optical axis of the parallel beam 21 from the third light source 18 has been described. However, as in a modification illustrated in FIG. 15, the light sources may be arranged so that the optical axes 10 and 21 thereof are on a plane that is at an angle of θth with respect to the optical axis 11. Moreover, the angle between the optical axis 10 and the optical axis 11 and the angle between the optical axis 21 and the optical axis 11 may be different from each other as long as it is within a range where the scattered light intensity and the particle size can be correlated.

In the present embodiment, an example in which the light source 2 and the third light source 18 emit light simultaneously has been described. However, light may be emitted alternately in time to acquire the corresponding scattered light images, and the particle size may be calculated.

The present invention is not limited to the above-described embodiments. Those skilled in the art can make various additions, changes, and the like within the scope of the present invention. The above-described embodiments are not limited to the configuration examples illustrated in the accompanying drawings. The configuration and the processing method of the embodiments can be changed appropriately within a range where the object of the present invention is attained.

The respective constituent components of the present invention can be selected arbitrarily, and an invention including the selected constituent components is also included in the present invention. Furthermore, the configurations described in the claims can be combined in forms other than the combinations explicitly stated in the claims.

What is claimed is:

1. A particle size measuring apparatus that measures a size of a particle, comprising:
   a first light source configured to emit parallel beam toward a sample containing particles;
   a first image capturing microscope disposed to approximately face the first light source with the sample disposed therebetween and configured to capture an image of the sample;
   a memory storing microprocessor-executable instructions;
   an image analyzing microprocessor configured by the micro-processor executable instructions to analyze the image captured by the first image capturing microscope, wherein:
   the first image capturing microscope and the first light source are in prescribed arrangement so as to approximately face each other so that an image of scattered light of the parallel beam incident on particles and scattered at a prescribed angle or smaller is captured by the first image capturing microscope, wherein:
   the prescribed arrangement indicates that an optical axis of the first image capturing microscope and a direction of the parallel beam cross each other at the prescribed angle or smaller, and
   the prescribed angle is determined as a threshold of a scattering angle at which the particle size can be identified from a difference in intensity of scattered light in particles; and the image analyzing microprocessor is configured to calculate a particle size on the basis of a scattered light image captured by the first image capturing microscope.

2. The particle size measuring apparatus according to claim 1, wherein the image analyzing microprocessor is configured to further acquire a particle shape image indicating a shape of a particle, calculate a particle size from the acquired particle shape image, and select and output any one of the particle size calculated from the particle shape image and a particle size calculated from the scattered light image.

3. The particle size measuring apparatus according to claim 2, wherein the image analyzing microprocessor is configured to select the particle size calculated from the particle shape image when the particle size calculated from the particle shape image is equal to or smaller than a prescribed size and otherwise, select the particle size calculated from the scattered light image.

4. The particle size measuring apparatus according to claim 3, further comprising:
a second light source configured to emit light toward the sample from a direction substantially matching an optical axis of the first image capturing microscope so that the particle shape image is captured by the first image capturing microscope.

5. The particle size measuring apparatus according to claim 3, further comprising:
a second image capturing microscope having a focal point near the sample similarly to the first image capturing microscope, wherein
the second image capturing microscope is configured to capture the particle shape image using the parallel beam emitted from the first light source to the sample.

6. The particle size measuring apparatus according to claim 2, further comprising:
a second light source configured to emit light toward the sample from a direction substantially matching an optical axis of the first image capturing microscope so that the particle shape image is captured by the first image capturing microscope.

7. The particle size measuring apparatus according to claim 2, further comprising:
a second image capturing microscope having a focal point near the sample similarly to the first image capturing microscope, wherein
the second image capturing microscope is configured to capture the particle shape image using the parallel beam emitted from the first light source to the sample.

8. A particle size measuring method for measuring a particle size, comprising:
emitting parallel beam from a first light source to a sample containing particles;
capturing an image of the sample using a first image capturing microscope disposed to approximately face the first light source with the sample disposed therebetween; and
analyzing the image captured by the first image capturing microscope using an image analyzing microprocessor, wherein:
the first image capturing microscope and the first light source are disposed so as to approximately face each other so that an image of scattered light of the parallel beam incident on particles and scattered at a prescribed angle or smaller is captured by the first image capturing microscope;
the prescribed arrangement indicates that an optical axis of the first image capturing microscope and a direction of the parallel beam cross each other at the prescribed angle or smaller;
the prescribed angle is determined as a threshold of a scattering angle at which the particle size can be identified from a difference in intensity of scattered light in particles; and
the analyzing involves calculating a particle size on the basis of a scattered light image captured by the first image capturing microscope.

* * * * *